United States Patent [19]

Black et al.

[11] Patent Number: 5,062,503
[45] Date of Patent: Nov. 5, 1991

[54] ABLATIVE BRAKE BUSHING FOR AXLE THERMAL PROTECTION

[75] Inventors: Raymond J. Black; Benjamin C. Han, both of South Bend, Ind.

[73] Assignee: Allied-Signal Inc., Morristown, N.J.

[21] Appl. No.: 585,415

[22] Filed: Sep. 19, 1990

[51] Int. Cl.[5] ............................................. F16D 55/36
[52] U.S. Cl. ................... 188/71.5; 188/71.6; 188/264 G; 384/277; 384/913
[58] Field of Search ............... 188/71.5, 71.6, 18 A, 188/264 G, 476, 264 R, 151 A; 384/276, 277, 317, 291, 297, 912, 913, 113

[56] References Cited

U.S. PATENT DOCUMENTS

| | | | |
|---|---|---|---|
| 2,955,677 | 10/1960 | Jones | 188/18 |
| 3,357,521 | 12/1967 | Lallemant | 188/72 |
| 3,726,572 | 4/1973 | Beardmore | 384/113 |
| 3,983,974 | 10/1976 | Dowell et al. | 188/264 AA |
| 3,991,804 | 11/1976 | Wilson | 152/427 |
| 4,117,912 | 10/1978 | Ruppe, Jr. | 188/216 |
| 4,195,714 | 4/1980 | Massing | 188/71.5 |
| 4,290,505 | 9/1981 | Kramer | 188/18 A |
| 4,372,628 | 2/1983 | Kiener et al. | 384/476 |
| 4,500,268 | 2/1985 | Sundberg et al. | 188/151 A X |
| 4,875,263 | 10/1989 | Furumura | 384/297 X |
| 4,944,370 | 7/1990 | Chambers et al. | 188/71.5 |

FOREIGN PATENT DOCUMENTS 2362205 6/1974 Fed. Rep. of Germany .
2161560 1/1986 United Kingdom .

Primary Examiner—Robert J. Oberleitner
Assistant Examiner—Peter M. Poon
Attorney, Agent, or Firm—Larry J. Palguta; Leo H. McCormick, Jr.; Robert A. Walsh

[57] ABSTRACT

The ablative bushing (40, 140, 240) is disposed between a torque tube pedestal (18) and an axle (30) of an aircraft. The ablative bushing (40, 140) encircles an axle bushing (26) located around the axle (30), so as to be disposed between the torque tube pedestal (18) and axle bushing (26). The ablative bushing (240) may also be located between a torque tube pedestal flange (114) and an axle flange (35). The ablative bushing (40, 140, 240) ablates at a predetermined temperature in order to introduce an air gap between the torque tube pedestal (18) and axle (30) to prevent excessive heat flow to the axle (30) during a rejected take-off stop.

26 Claims, 4 Drawing Sheets

ABLATIVE BRAKE BUSHING FOR AXLE THERMAL PROTECTION

The present invention relates generally to an ablative bushing, and in particular to an ablative bushing disposed about an aircraft axle.

A design requirement for an aircraft brake requires that the brake must absorb the aircraft kinetic energy associated with a rejected take-off (RTO). This is a very infrequent situation in which the aircraft reaches take-off speed at which time the pilot, because of some emergency condition, rejects taking off. He immediately applies the brakes to maximum pressure in order to stop the plane in the remaining portion of the runway. Because the plane is loaded with its maximum Passenger, cargo and fuel loads and because the velocity of the airplane is quite high (typically 200 to 215 miles per hour on a modern commercial jet aircraft), the kinetic energy to be absorbed by the brake is very large. Some of the energy is absorbed by aerodynamic drag but because the aerodynamic surfaces are in a take-off mode, the drag is at a minimum compared to normal landing conditions in which spoilers are deployed, reverse thrust is utilized, and flap settings are in the landing mode. The kinetic energy per brake is converted to heat during the RTO stop. This brings the heat stack up to very high temperatures. For example, a typical modern carbon brake heat stack reaches average heat stack temperatures of 3000° F. the completion of a $62 \times 10^6$ ft-lb RTO stop. Following the RTO stop, the heat flows to other portions of the brake/wheel/tire and the landing gear--particularly the axle. The brake is mounted on the axle via relatively stiff bushings and the torque tube pedestal. The torque tube pedestal provides a high conductivity heat path to the axle. If a passive insulator is used in this heat path, the flexibility of the passive insulator must be kept to a minimum to prevent destructive brake vibration. In most designs, the passive insulator comprises a bushing made of low conductivity materials such as resin, fiberglass, etc., which is placed between the torque tube pedestal and a bronze axle bushing disposed about the axle, in order to provide a thermal barrier. As mentioned above, the shortcomings of these non-metalic insulators are the low stiffness and low operating temperature limits. Because of this, heat flow to the axle after an RTO stop is sufficient to raise the axle temperature to unacceptable levels. Usually, the high strength steel axle is plated with cadmium to protect its surface from corrosion. When axle temperature reaches above 500° F., diffusion between cadmium and steel could result in brittlement of the axle surface. Therefore, it is very desirable to limit the conductive heat flow from the torque tube Pedestal to the axle. Convection and radiation are not important modes of heat transfer at such a condition.

The present invention provides for the replacement of the normal bushing materials used for a brake mounting with an ablative material which would form a thermal fuse at the brake/axle interface. The ablative bushing is made of a eutectic alloy or meltable material which possesses a higher modulus of elasticity and will flow, melt, or vaproize at a predetermined temperature at its surface to create an air gap which discontinues the conductive heat flow. The ablative bushing provides a unique approach to maintaining high stiffness and high heat resistance at critical temperatures.

The present invention provides solutions to the above problems by disclosing an ablative aircraft bushing comprising a thermal fuse which provides thermal protection for an axle, the aircraft bushing for supporting a brake mechanism at said axle and comprising an annular bushing having a central opening, radially exterior axially extending grooves disposed circumferentially spaced-apart from one another, the bushing made of an ablative material which has a compressive modulus of at least $1 \times 10^6$ psi and which ablates at a predetermined temperature in order to effect an air gap which reduces heat flow to said axle.

The invention is described in detail below with reference to the drawings which illustrate embodiments in which.

Figure 1:
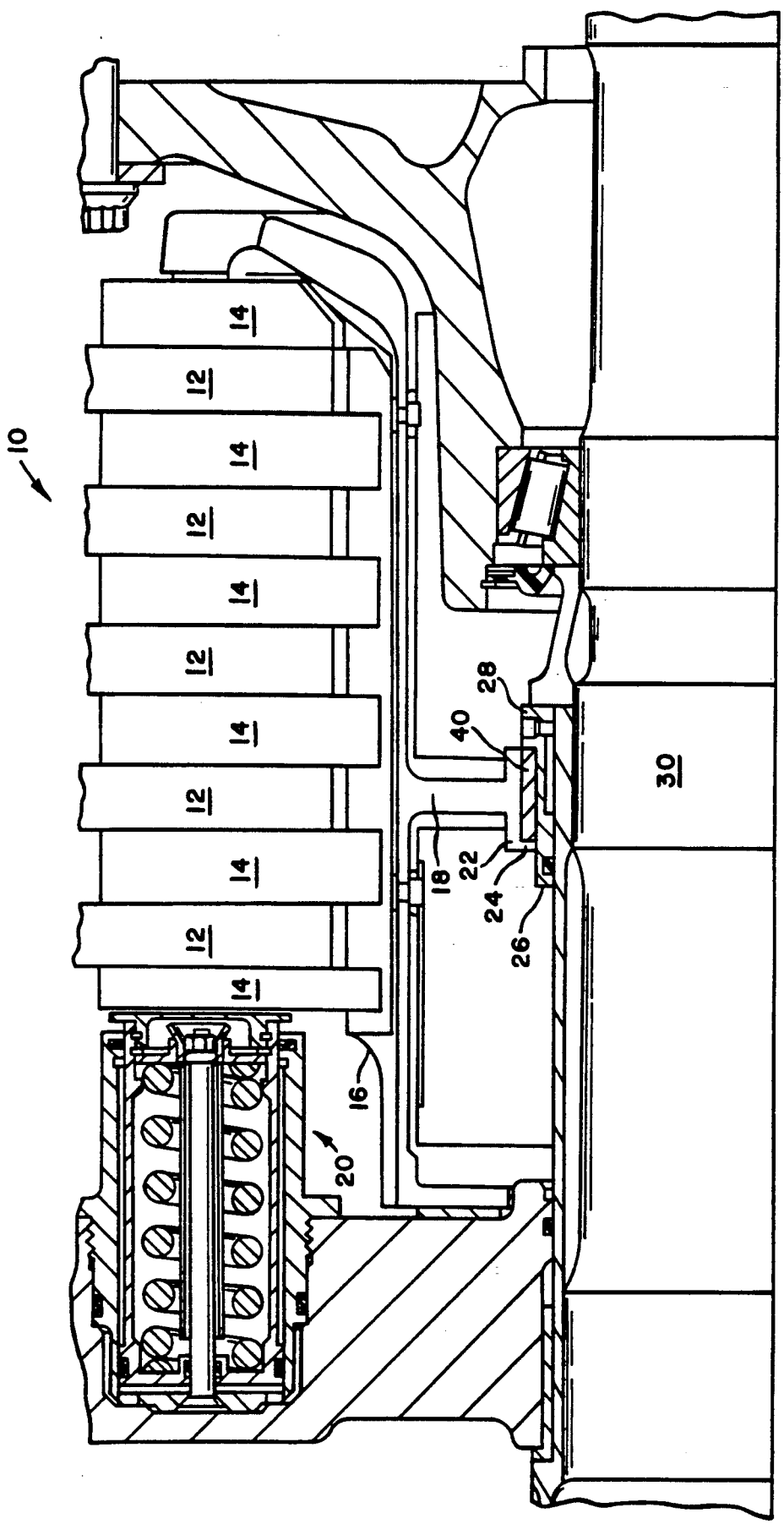
FIG. 1 is a section view of a typical aircraft brake mounted about the axle which includes applicants ablative bushing.
Figure 2:
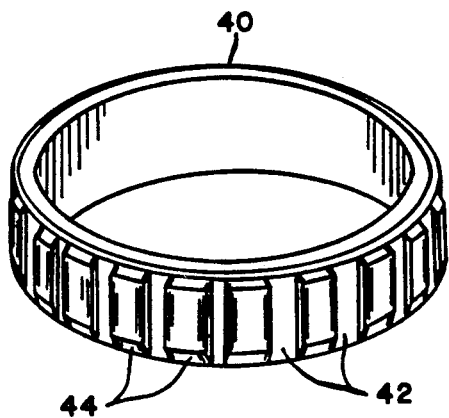
FIG. 2 is a perspective view of an embodiment of the ablative bushing.
Figure 3:
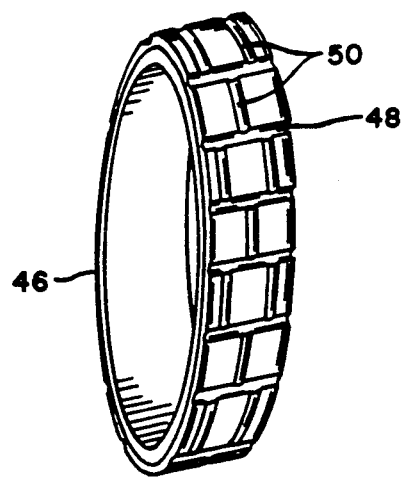
FIG. 3 is a perspective view of another embodiment of the ablative bushing of the present invention.

FIG. 1 illustrates a partial section view of an aircraft brake disposed about an aircraft axle. The brake 10 includes a heat stack of carbon rotors 12 disposed between carbon stators 14. A plurality of pistons 20 are actuated hydraulically to clamp together the rotors 12 and stators 14 in order to effect braking of the aircraft. Stators 14 are attached to support member or torque tube 16 which includes torque tube pedestal 18. Torque tube pedestal 18 includes axially extending, L-shaped base 22 which has foot 24 that engages beryllium-copper or aluminum bronze axle bushing 26 disposed about aircraft axle 30. Bushing 26 may be made of any material suitable for its purpose. Axle bushing 26 is generally L-shaped and has a foot 28 so that an ablative bushing 40 is captured axially between feet 24, 28 of the torque tube pedestal and bronze bushing. In prior constructions, insulative materials were utilized in place of ablative bushing 40 and these materials had a compressive modulus of 400,000 psi to a maximum of $1 \times 10^6$ psi. As discussed above, the slow conductivity insulative materials comprise resin, fiberglass, and so on which are placed between torque tube pedestal base 22 and bronze axle bushing 26 in order to serve as a thermal barrier. Ablative bushing 40 is illustrated in FIG. 2 wherein the bushing includes a plurality of axial grooves 42 and opposite axial edges of the bushing may include beveled portions 44. Bushing 40 comprises an ablative metallic material having a modulus of at least $1 \times 10^6$ psi and thus provides a much more stable brake configuration from the standpoint of whirl vibration. Bushing 40 provides good support stiffness for the brake under normal operating conditions. The ablative bushing may comprise a eutectic alloy consisting of 95% Zn and 5% Al, which would provide a melting or flow temperature of approximately 720° F. Of course, the particular composition of the ablative bushing may be altered as needed in order to provide a different melting temperature. For example, a eutectic bushing compound of 96.5% tin and 3.5% silver would provide a melting temperature of approximately 430° F. Also, low melting temperature alloys or materials which ablate within an appropriate temperature range may be utilized depending on the structure of the brake and position of the ablative bushing. Table I below lists example eutectic materials and meltable materials which may be utilized for the ablative bushing of the present invention, according to desired design requirements. The materials have a temperature range of approximately 500°-1220° F., although this range may be broader if higher or lower temperature materials are desired.

TABLE I

| Alloy | Eutectic/ Melting Point | Temperature °F. Liquidus | Temperature °F. Solidus | Density Lb/in$^3$ |
|---|---|---|---|---|
| 82.6 Cd, 17.4 Zn | E | 511 | 511 | .3014 |
| 100 Bi | MP | 520 | | .3541 |
| 80 Au, 20 Sn | E | 536 | 536 | .5242 |
| 90 Pb, 5 Ag, 5 Sn | MP | 558 | | .3971 |
| 92.86 Pb, 4.76 In, 2.38 Ag | MP | 572 | | .3982 |
| 92.5 Pb, 5 In, 2.5 Ag | MP | 572 | | .3978 |
| 97.5 Pb, 2.5 Ag | E | 579 | 579 | .4090 |
| 97.5 Pb, 1.5 Ag, 1 Sn | E | 588 | 588 | .4072 |
| 98 Pb, 1.2 Sb, .8 Ga | MP | 600 | | .4043 |
| 100 Pb | MP | 620 | | .4090 |
| 88 Au, 12 Ge | E | 673 | 673 | .5301 |
| 96.4 Au, 3.6 Si | E | 698 | 698 | .5564 |
| 95 Zn, 5 Al | E | 720 | 720 | .2383 |
| 55 Ge, 45 Al | E | 795 | 795 | .1339 |
| 45 Ag, 38 Au, 17 Ge | E | 977 | 977 | .3823 |
| 88.3 Al, 11.7 Si | E | 1070 | 1070 | .0961 |
| 55 Ag, 22 Cu, 17 Zn, 5 Sn | MP | 1220 | | .0976 | grooves would provide storage volume and flow paths for molten eutectic material.

Figure 4:
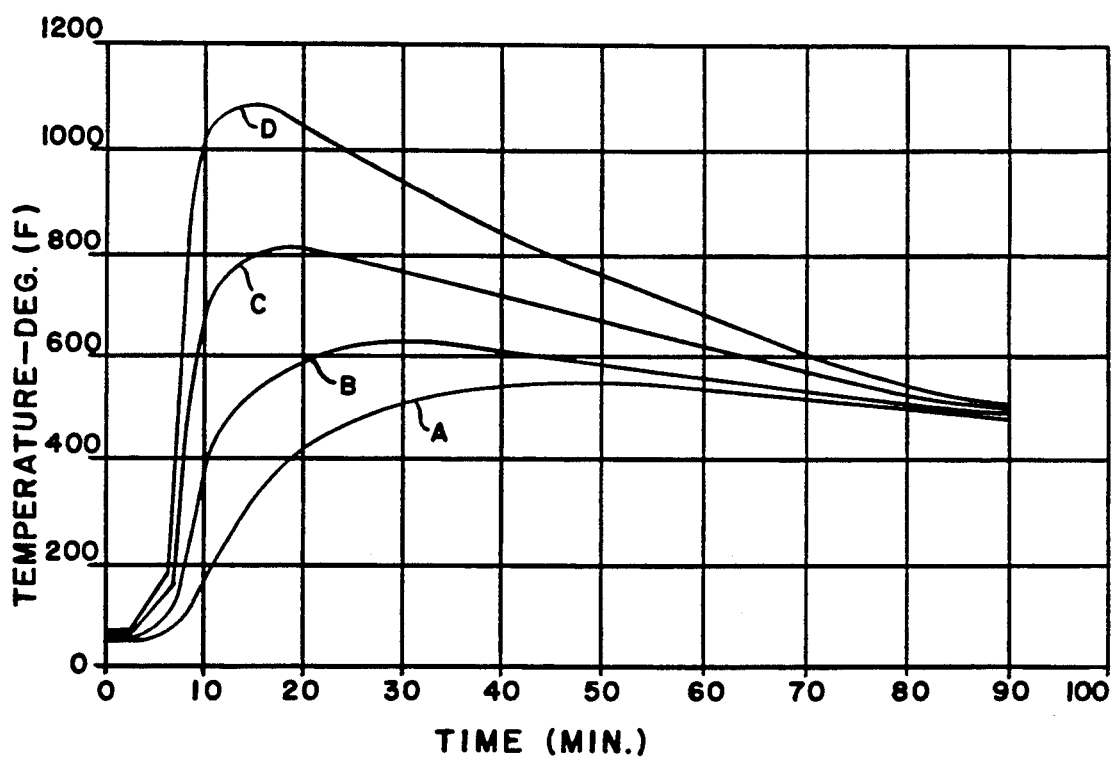
FIG. 4 is a graph illustrating a computer simulated thermal analysis of an aircraft brake, standard bushing, bronze bushing, and aircraft axle.
Figure 5:
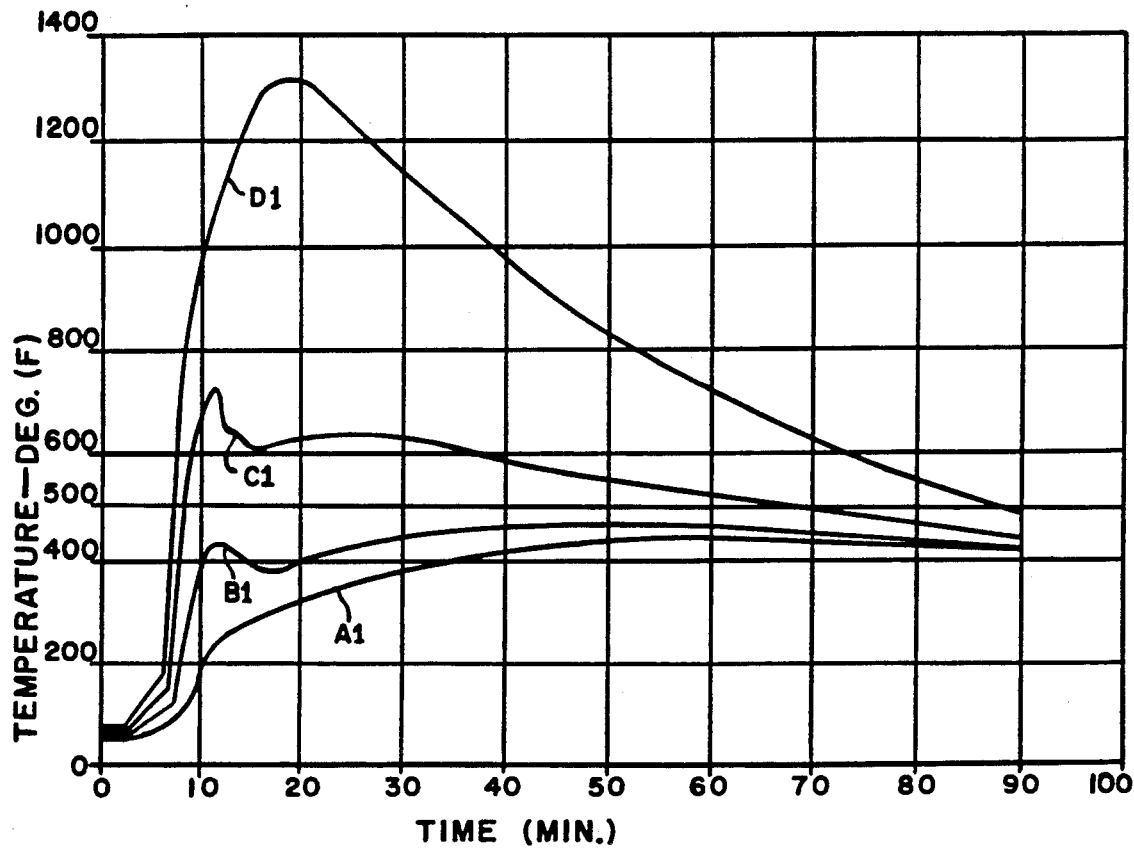
FIG. 5 is a graph of a computer simulated thermal analysis of the aircraft brake, ablative bushing, bronze bushing, and aircraft axle.

A computer simulation was utilized in order to provide a thermal analysis of the ablative bushing of the present invention. A large production wheel, brake and an axle assembly was used as the model. The binary eutectic alloy of 95% Zn and 5% Al was selected for the ablative axle bushing. The melting temperature of such a bushing is 720° F. The RTO kinetic energy is 105 million joules. FIGS. 4 and 5 illustrate via the computer simulation the results of RTO stops wherein the brake and axle connections contain a standard prior insulative material bushing and an ablative bushing in accordance with the present invention, respectively.

FIG. 4 illustrates the temperatures experienced by an aircraft brake and axle during a simulated rejected take-off stop wherein a prior standard insulative material bushing was disposed between the torque tube pedestal and a bronze axle bushing located about the axle. Curve A illustrates the temperature of the axle during and after the simulated RTO stop. Curve B illustrates the temperature of the axle bushing. Curve C illustrates the temperature of the insulative bushing made out of typical prior insulative material, and Curve D illustrates the temperature of the torque tube pedestal As the brake, wheel and axle of the aircraft commences through the rejected take-off test which reached a kinetic energy of 105 million joules, the carbon brake heat stack created a temperature which caused the torque tube pedestal to reach a temperature of approximately 1,090° F. Heat was transferred through the torque tube pedestal to the insulative bushing, bronze axle bushing and axle such that the axle reached a peak temperature of 550°. As discussed above, the temperature of the axle should remain below 500° in order to prevent degradation of the cadmium coating. A temperature of 550° is deleterious to the axle and may result in the axle having to be replaced, along with the brake, wheel and tire, after an RTO stop.

Referring to FIG. 5, an RTO stop was simulated which generated 105 million joules of energy and wherein the ablative bushing of the present invention was utilized. Curve A1 represents the axle temperature, Curve B1 represents the temperature of the bronze axle bushing, Curve C1 represents the temperature of the ablative bushing made in accordance with the present invention, and Curve D1 represents the temperature of the torque tube pedestal. The torque tube pedestal reached a maximum temperature of approximately 1320° F. At approximately 11 minutes into the simulated RTO test stop, the ablative bushing reached its maximum temperature of 720° F. wherein melting of part of the bushing occurred such that air gaps were created between the torque tube pedestal and the axle bushing. This is illustrated by the decrease in the temperature of the bushing as illustrated by Curve C1, the corresponding decrease in the temperature of the bronze axle bushing illustrated by Curve B1, and the noticeable dip in the rate of increase of the temperature of the axle as illustrated by Curve A1. The maximum or peak temperature of the axle was 440° at approximately 55 minutes such that the ablative bushing of the present invention successfully maintained the axle temperature below 500° F.

Figure 6:
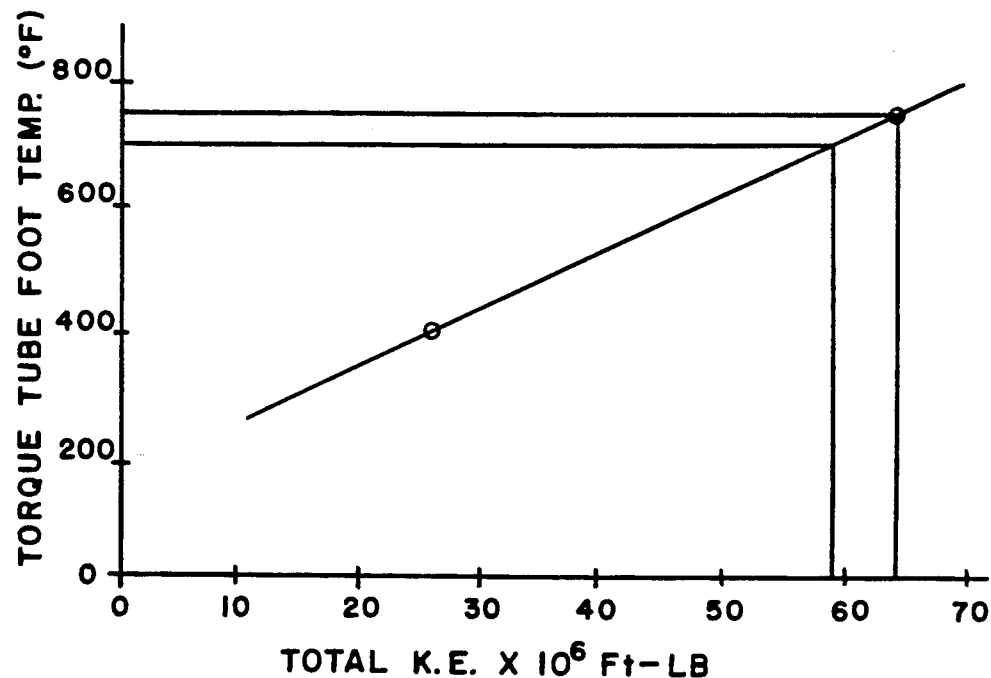
FIG. 6 is a graph showing the relationship between the temperature of the torque tube pedestal and the total kinetic energy of an RTO stop.

FIG. 6 is a graphic illustration of the temperatures produced according to the total kinetic energy generated during a rejected take-off stop. FIG. 6 illustrates that approximately 58-60 × 10$^6$ ft-lb of kinetic energy is required during an RTO in order to generate a torque tube foot temperature in the range of approximately 720° F.

Figure 7:
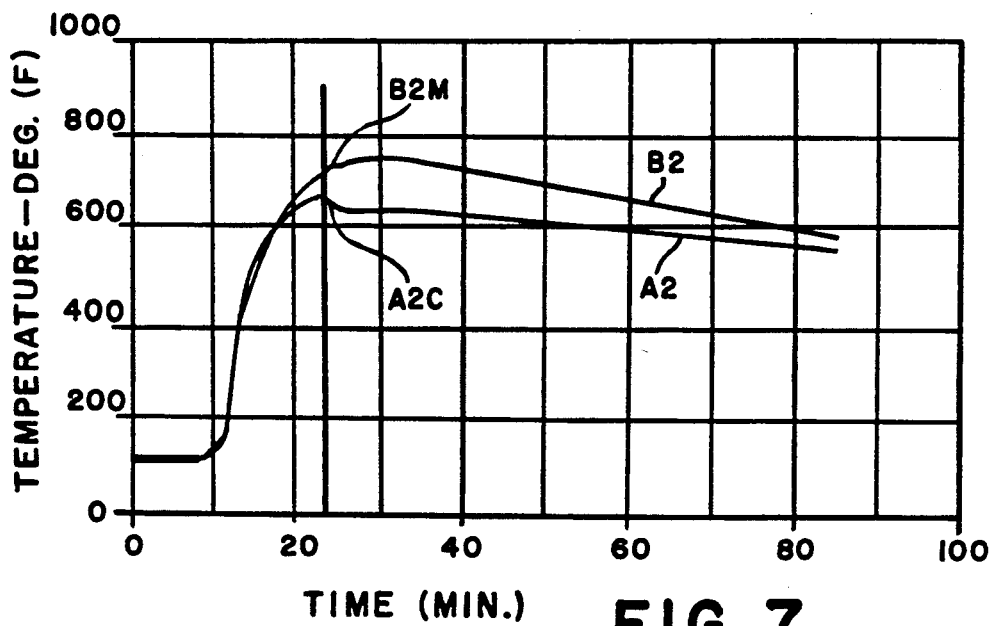
FIG. 7 is a graph illustrating the test results of an aircraft brake and wheel with an ablative bushing experiencing an RTO stop.

An RTO stop test utilizing an actual aircraft brake, wheel, tire and axle was accomplished utilizing an ablative bushing made out of a eutectic alloy consisting of 95% Zn and 5% Al. The eutectic alloy and bushing has a melting temperature of 720° F. The RTO stop comprised a series of preliminary brake stops followed by the full RTO stop. The preliminary brake stops comprised three taxi stops at approximately 29 mph, a landing stop at approximately 134 mph, three taxi stops again at about 29 mph, and then a repeat of the aforedescribed seven stops. These preliminary brake stops were followed by the RTO stop sequence which comprised one taxi stop at approximately 29 mph, a taxi roll for 1 mile, a taxi stop at approximately 29 mph, a taxi roll for one mile, a taxi stop at approximately 29 mph, a taxi roll of 7500 feet and then an RTO at 209 mph which generated 64 × 10$^6$ ft-lb kinetic energy. FIG. 7 illustrates temperatures resulting from the RTO stop. Curve A2 represents the temperature of the bronze axle bushing, and Curve B2 is the temperature of the torque tube pedestal foot. The results of the preliminary brake stops was that the ablative bushing reached a temperature of approximately 400° F. during the preliminary brake stop portion of the test (not shown in FIG. 7). There was no damage or melting to the ablative bushing during the preliminary brake stop portion of the test. The eutectic bushing melted at approximately 720° after the RTO stop, and its effect is illustrated in FIG. 7. At point B2M (720° F.) of the torque tube pedestal foot curve, the ablative bushing activated, and the temperature of the bronze axle bushing on curve A2 began to decrease immediately at point A2C. The ablative bushing maintained adequate strength and shape up to the melting. The molten eutectic alloy fell harmlessly into the wheel well after the RTO stop and the axle was not damaged by the heat of the RTO. The ablative bushing tended to ablate or melt in areas of contact with the torque tube pedestal, and the ablative bushing lowered the temperature of the bronze bushing and prevented further heat flow from the torque tube pedestal into the bronze axle bushing and axle.

Figure 8:
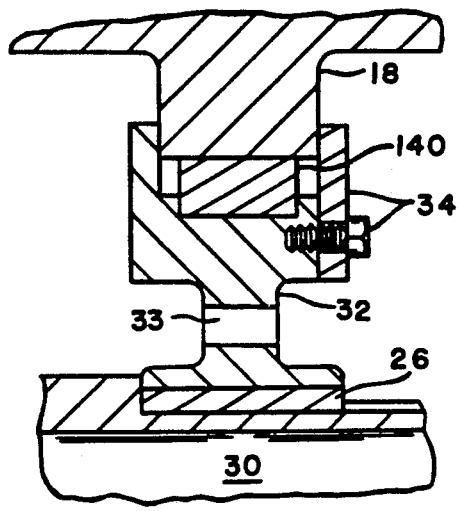
FIG. 8 is an illustration of an ablative bushing located radially outwardly of the axle bushing.

Referring to FIG. 8, a partial view of an aircraft brake disposed about an axle illustrates an ablative bushing in accordance with the present invention which is disposed radially outwardly of the axle bushing 26. Torque tube pedestal 18 is essentially divided into two parts, pedestal 18 and foot 32. Foot 32 includes a bolt and flange 34 which provides a seat for ablative bushing 140 and pedestal 18. Foot 32 includes access openings 33. Because ablative bushing 140 is disposed radially closer to the carbon heat stack comprising rotors 12 and stators 14, its ablative or melting temperature should be higher so that it will activate at an appropriate temperature. Ablative bushing 140 comprises a eutectic material consisting of 88.3% aluminum and 11.7% silicon,. Ablative bushing 140 will activate at 1070° F. As the ablative bushing of the present invention is moved radially outwardly and closer to the carbon heat stack, it is necessary to select appropriate compositional materials so that the bushing will activate at a temperature appropriate for its radial position relative to the heat stack and axle.

Figure 9:
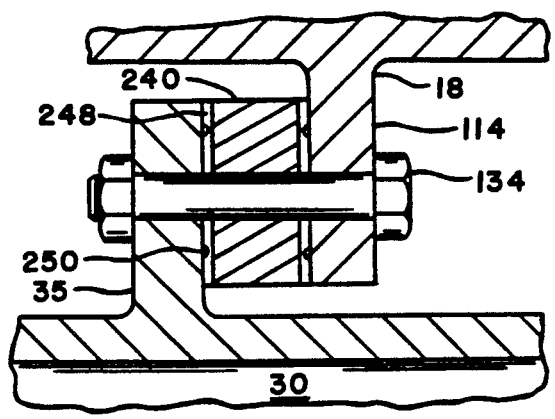
FIG. 9 is an illustration of an ablative bushing located between an axle flange and brake support member.

Referring to FIG. 9, a partial section view of an aircraft brake disposed about an axle 30 includes the heat stack of rotors and stators, torque tube pedestal flange 114, and an axle flange 35 secured by a plurality of bolts and nuts 134 to the flange 114. Located axially between pedestal flange 114 and axle flange 135 is an ablative bushing 240 of the present invention, bushing 240 having radial grooves 248 and annular intermittent grooves 250. As above, the composition of the ablative bushing is selected to be appropriate for its position relative to the heat stack axle so that it will ablate or melt after only a rejected take-off situation.

The ablative bushing of the present invention may be utilized between the torque tube pedestal and aircraft axle in order to provide adequate support for the torque tube pedestal while also providing a thermal fuse in case of an RTO stop. The ablative bushing will ablate, flow, melt, or vaporize at a predetermined temperature so as to introduce ablated or melted away areas that provide air gaps between the torque tube pedestal and axle whereby heat flow from the heat stack through the torque tube pedestal to the axle is significantly reduced. This enables the aircraft axle to be adequately protected so that after an RTO stop the axle need not be replaced.

We claim:

1. In combination, an ablative bushing utilized with a brake mechanism in order to protect thermally an axle, comprising a brake mechanism receiving support from a support member, the support member having a central aperture through which extends an axle,. one of bushing means and flange means disposed between said axle and support member, and an ablative bushing disposed between the support member and one of the bushing means and flange means, the ablative bushing ablatable at a predetermined temperature in order to introduce an air gap between said support member and one of the bushing means and flange means in order to reduce heat flow from said brake mechanism to said axle.

2. The ablative bushing, brake mechanism, and axle in accordance with claim 1, wherein the support member comprises a pedestal of a torque tube, the pedestal having a radially inner L-shaped flange and the bushing means having a complementary L-shaped form so that said ablative bushing is captured therebetween.

3. The ablative bushing, brake mechanism, and axle in accordance with claim 1, wherein the ablative bushing comprises a eutectic alloy of 95% Zn and 5% Al.

4. The ablative bushing, brake mechanism, and axle in accordance with claim 1, wherein the approximate ablative temperature of said ablative bushing is approximately 720° F.

5. The ablative bushing, brake mechanism, and axle in accordance with claim .1, wherein the brake mechanism comprises an aircraft brake and the axle comprises an aircraft axle.

6. The ablative bushing, brake mechanism, and axle in accordance with claim 1, wherein the ablative bushing includes axial grooves thereabout.

7. The ablative bushing, brake mechanism, and axle in accordance with claim 6, wherein axial ends of the ablative bushing comprise beveled portions between said axial grooves.

8. The ablative bushing, brake mechanism, and axle in accordance with claim 6, wherein the ablative bushing includes intermittent circumferencial grooves communicating with said axial grooves in order to provide flow paths and storage volume for molten eutectic material of the ablative bushing.

9. The ablative bushing, brake mechanism, and axle in accordance with claim 1, wherein the ablative bushing comprises a eutectic alloy of 96.5% tin and 3.5% silver.

10. The ablative bushing, brake mechanism, and axle in accordance with claim 1, wherein the support member includes a foot portion located between the ablative bushing and bushing means, so that the ablative bushing is located radially outwardly from the bushing means.

11. The ablative bushing, brake mechanism and axle in accordance with claim 10, wherein the ablative bushing comprises a eutectic alloy of 88.3% Al and 11.7% Si.

12. The ablative bushing, brake mechanism and axle in accordance with claim 10, wherein the approximate ablative temperature of the ablative bushing is 1070° F.

13. The ablative bushing, brake mechanism and axle in accordance with claim 1, wherein the flange means is connected to the support member by way of connection means, and the ablative bushing is located between the support member and flange means.

14. The ablative bushing, brake mechanism and axle in accordance with claim 13, wherein the ablative bushing includes radially extending grooves.

15. An ablative aircraft bushing comprising a thermal fuse which provides thermal protection for an axle, the aircraft bushing for supporting a brake mechanism at said axle and comprising an annular bushing having a central opening, radially exterior axially extending grooves disposed circumferentially spaced-apart from one another, the annular bushing made of an ablative material which has a compressive modulus of at least $1 \times 10^6$ psi and which ablates at a predetermined temperature in order to effect an air gap which reduces heat flow to said axle.

16. The ablative aircraft bushing in accordance with claim 15, wherein the ablative aircraft bushing comprises a eutectic alloy of 95% Zn and 5% Al.

17. The ablative aircraft bushing in accordance with claim 15, wherein the ablative temperature of said ablative aircraft bushing is approximately 720° F.

18. The ablative aircraft bushing in accordance with claim 15, wherein the annular bushing includes intermittent circumferentially extending grooves communicating with said axially extending grooves to provide molten material flow paths for the ablative aircraft bushing.

19. The ablative aircraft bushing in accordance with claim 15, wherein the ablative aircraft bushing comprises a eutectic alloy of 96.5% tin and 3.5% silver.

20. The ablative aircraft bushing in accordance with claim 15, wherein the ablative aircraft bushing comprises a eutectic material of 88.3% Al and 11.7% Si.

21. The ablative aircraft bushing in accordance with claim 15, wherein the ablative temperature of the ablative aircraft bushing is approximately 1070° F.

22. An ablative aircraft bushing comprising a thermal fuse which provides thermal protection for an axle, the aircraft bushing for supporting a brake mechanism at said axle and comprising an annular bushing having a central opening, axially exterior radially extending grooves disposed spaced-apart from one another, the annular bushing made of an ablative material which has a compressive modulus of at least $1 \times 10^6$ psi and which ablates at a predetermined temperature in order to effect an air gap which reduces heat flow to said axle.

23. The ablative bushing in accordance with claim 22, wherein the ablative aircraft bushing comprises a eutectic alloy of 95% Zn and 5% Al.

24. The ablative aircraft bushing in accordance with claim 22, wherein the ablative temperature of said ablative aircraft bushing is approximately 720° F.

25. The ablative bushing in accordance with claim 22, wherein the annular bushing includes intermittent annularly extending grooves communicating with said radially extending grooves to provide molten material flow paths for the ablative aircraft bushing.

26. The ablative bushing in accordance with claim 22, wherein the ablative aircraft bushing comprises a eutectic alloy of 96.5% tin and 3.5% silver.

* * * * *